3,354,653
METHOD FOR APPLYING BITUMINIZED MINERAL AGGREGATE TO AN UNDERWATER SURFACE
Hermanus Meijer, Heemstede, and Jacobus E. Mebius, The Hague, Netherlands, assignors to Shell Oil Company, New York, N.Y., a corporation of Delaware
No Drawing. Filed Sept. 4, 1964, Ser. No. 394,601
Claims priority, application Netherlands, Sept. 9, 1963, 297,636
6 Claims. (Cl. 61—1)

The invention relates to a process for the preparation of a bituminized mineral aggregate having a relatively low bitumen content, preferably sand asphalt, suitable for use under water, by mixing mineral aggregate and a bituminous binder at elevated temperature.

For the construction of dams, dikes and other weirs extensive use is made of sand, clay, boulder-clay, concrete blocks and stone rubble. Preferably the material used will be those which are the least expensive for the relevant project. Hence, in places where the current velocity is lowest and the water erosion mildest, mainly sand will be employed. With higher current velocities, however, the use of materials which are more resistant to the current, such as boulder-clay or stone-blocks, are used.

For the above purpose, use has also been made recently of warm bituminized sand, which usually has a relatively low bitumen content. This bituminized sand, which may contain 1–5% by weight of bitumen, can be applied under water by dumping it with the aid of grab cranes or hopper barges. Such a bituminized sand asphalt with a relatively low bitumen content appears to be very erosion-resistant and as such as comparable with boulder-clay or stone rubble.

When using warm bituminized sand, a prerequisite for achieving the optimum result is, however, that the mass to be dumped falls as a substantially compact mix into, and also sinks through, the water. If, in fact, the dumped material breaks and falls into the water in lumps and fragments, it is possible that these separate parts will be entrained by the flowing water.

It has often been the experience that when the dumped hot sand asphalt comes into contact with the water it does indeed break into lumps and fragments. Attempts have been made to explain this as follows: The mass to be dumped has a large number of air-filled water permeable pores. During dumping into the water the air in the pores is rapidly expelled by the influent water. The effluent air stream, as it were, forces up part of the porous mass, thereby exerting a destructive force. Moreover, the influent water will, however, be partially converted into steam and/or water vapor, viz. in those places where the bituminous mass still has a very high temperature. Owing to the very great and rapid increase in volume during the transition from water into vapor, the dumped material will, so to speak, explode.

The object of the invention is to provide a process for the preparation of a bituminized mineral aggregate having a relatively low bitumen content which can be used in the warm state under water without the dumped material breaking as a result of the above-mentioned forces.

According to the process of the invention a small percentage of water is added during or after the preparation of the bituminized mineral aggregate, care being taken that the final temperature of the total mixture preferably lies below 100° C. Of course, the final temperature of the total mixture must also be sufficiently high that the mixture will flow. That is, it must be at least above ring and ball (R and B) softening point of the bituminous binder. Preferably, the mixture should be applied at a temperature of at least 5° C. above the R and B softening point of the bitumen.

Preferably, the amount of water added is such that the water content in the final mineral aggregate is 1–3% by weight; a larger quantity of water may, however, very suitably be added, but in this case care should be taken that the working temperature of the warm product does not become too low. In general, this temperature depends on the bitumen employed. The viscosity of this binder must not become so high that the bitminized mass having a relatively low bitumen content either remains too friable or does not set sufficiently on the subsoil.

In this application, "mineral aggregate" is intended to include sand, mixed or unmixed with gravel, broken stone or filler. Gravel and broken stone have a particle size greater than that of sand, and filler has a particle size smaller than that of sand.

By "sand" is meant a mineral material which is retained on a 0.075 sieve but passes a 2.4 sieve. The sieves are Netherlands standard sieves as defined in N 480 and N 574 (Netherlands Standards). Sand according to the "Specifications laid down by the Department of Ways and Communications for Building Materials for Road Construction 1957" may itself also contain minor quantities of material which does not satisfy the sieve specifications. The term "sand" in the application should also be understood to have this meaning.

The invention will be illustrated with reference to sand asphalt as the bituminized mineral aggregate having a relatively low bitumen content.

It is presumed that, owing to the presence of a small percentage of water in the sand asphalt, the pores thereof are already filled with water vapor and/or water before the mix is dumped, so that the influent water does not set up any additional vapor pressure during the dumping operation as a result of which breaking of the dumped material is avoided. The influent cold water is likely to condense the water vapor present in the pores, so that a binding force instead of a destructive force is exerted on the dumped material.

It is possible also to incorporate a wetting agent, for example in the form of a soap or an alkyl sulfonate, into the water added to the hot sand asphalt. This results in a better distribution of the water in the bituminous mass on the one hand and on the other favors a quicker penetration of the water into the pores during the dumping operation.

A preferred bituminous binder is a straight-run or semi-blown asphaltic bitumen having a penetration index of between —2 and +2. Soft straight-run bitumens having a penetration of the order of 100–300 at 25° C. are preferred. Such straight-run bitumens have a softening point (ring and ball) of 27–54° C. Tar or a mixture of asphaltic bitumen and tar may also be employed as binder. Penetration index, which is a relationship of penetration and ring and ball softening point, is defined in accordance with the following relationship:

$$90 \log \frac{800}{P} = \left(\frac{20-\text{P.I.}}{10+\text{P.I.}}\right)(S-77)$$

wherein
$P$=penetration, dmm. at 77° F. (ASTM D5)
$S$=R and B softening point, ° F. (ASTM E28–58T)
$P.I.$=penetration index
(Refer to Pfeiffer et al., National Petroleum News, 40, pp. R–78–84, 1938.)

When asphaltic bitumens are employed in said asphalt, it is advisable also to incorporate a dope (wetting agent) in order to obtain better adhesion of the bitumen to the sand. The dope to be employed should be adjusted according to the type of sand to be used; in the case of sand of the silicate type, a cation-active dope is preferably used.

The process of the invention can be carried out by admixing warm, dry sand with warm asphaltic bitumen in a mixing drum. When a well-mixed sand asphalt mixture has been obtained the calculated amount of water is added. In doing so care is taken that the final temperature of the final mixture preferably lies below 100° C.

In this connection it may be observed that, when preparing sand asphalt in practice, this upper limit neither can nor need be adhered to with academic precision. Deviations of up to +5° may suitably be tolerated without adverse effect.

However, use may also be made of wet sand which is dried to the desired degree of humidity and subsequently bituminized below 100° C. The advantage of this method is that the necessity of first drying the sand completely and then adding the desired amount of water is obviated. The resulting bituminized sand asphalt having a low bitumen content can then be handled immediately.

The invention will now be illustrated with reference to the following examples:

EXAMPLE I

Sand asphalt was prepared by drying sand in a Barber-Greene continuous mixing plant and mixing it at a temperature of 130° C. with about 3½ by weight of bitumen having a penetration of 280–320. The final mixture fell from the mixer on to a conveyor belt 100 meters in length and was dumped via this belt into a barge. The barge subsequently proceeded to deep water, where a floating rig and a grab crane were waiting. Suspended from the rig was a frame about 5 x 5 meters in size having a floor perforated steel plate. The frame was lowered 5 meters under water and then each time about 3 tons of the sand asphalt mass was dumped on to the frame in one go by the grab. After each dumping operation the perforated frame was hoisted above the water and the result examined.

In the manner described above two test batches were dumped, each of them weighing about 50 tons. To the first batch no water was added and to the second batch about 3% of water. The water was added immediately before the mixture left the mixer. Although at the moment the water was added the sand was entirely coated with bitumen, the mixing of this sand asphalt and water was very intimate. Owing to the long conveyor belt and the prevailing weather conditions the temperature of the sand asphalt of both batches dropped considerably. Prior to the dumping operation, the temperature in the barge was 85° C. in the case of batch 1 and 65° C. in the case of batch 2, measured in the mass. Both temperatures were higher than the softening point of the asphalt.

After the dumping operation the results were as follows:

| Dumping Height | Batch 1 | Batch 2 |
| --- | --- | --- |
| Dumping height of 0.5 m. above water. | Thin layer decreasing in thickness, with a central hill about 1/2 m. high. | Even layer with a uniform thickness of 15-20 cm. spread out over entire surface. Mass is very friable. |
| Grab opened under water. | Thin layer decreasing in thickness, with ridges 60 cm. high. When grab opened, mixture was torn in two pieces. | Evenly spread layer of a friable mass without ridges. |

EXAMPLE II

A batch of sand asphalt of 50 tons was prepared in the same way as in Example I. At the moment this batch fell from the conveyor belt into the barge, about 3% of water was added to the sand asphalt by means of a hose. In this case there was only incomplete mixing.

The results of the dumping tests were as follows:

Dumping height:
    0.5 m. above water__ Thin layer decreasing in thickness, with small ridge-hills in the corners.
    Grab opened under water_____ Layer decreasing in thickness, with a central ridge about 60 cm. high.

We claim as our invention:

1. In a process for applying bituminized mineral aggregate to reduce erosion of underwater surfaces by dumping a mass of warmed bituminized mineral aggregate into the water and allowing it to sink through the water onto the surface to be protected, the improvement comprising (1) admixing with the bituminized mineral aggregate, prior to dumping, a minor amount of water sufficient to completely fill the pores of said aggregate, the temperature of the water-containing mixture being between the softening point of the bitumen in the bituminized mineral aggregate and about 100° C., and (2) dumping the water-containing mixture while it is maintained within the aforesaid temperature limits.

2. In a process for applying bituminized mineral aggregate to reduce erosion of underwater surfaces by dumping a mass of warmed bituminized mineral aggregate into the water and allowing it to sink through the water onto the surface to be protected, the improvement comprising (1) admixing with the bituminized mineral aggregate, prior to dumping, a minor amount of water, sufficient to raise the water content of the bituminized mineral aggregate to 1–3% by weight of the total mixture, the temperature of the water-containing mixture being between the softening point of the bitumen in the bituminized mineral aggregate and about 100° C., and (2) dumping the water-containing mixture while it is maintained within the aforesaid temperature limits.

3. The process of claim 1 in which the water is admixed with already-formed bituminized mineral aggregate.

4. The process of claim 1 in which the water is admixed with the bituminized mineral aggregate by mixing warm, wet mineral aggregate with warm bitumen at a temperature below about 100° C.

5. The process of claim 1 in which the bitumen is an asphalt having a penetration index of between −2 and +2.

6. The process of claim 1 in which the mineral aggregate is sand.

References Cited

UNITED STATES PATENTS

| | | | |
| --- | --- | --- | --- |
| 1,987,152 | 1/1935 | Mason | 61—4 |
| 2,130,044 | 9/1938 | Subkow et al. | 61—30 |
| 2,378,235 | 6/1945 | Miles | 61—36 |
| 2,876,686 | 3/1959 | Birney | 106—283 X |
| 3,252,290 | 5/1966 | Gagle et al. | 61—36 |

FOREIGN PATENTS 91,060    5/1959    Netherlands.

EARL J. WITMER, *Primary Examiner.*